United States Patent [19] [11] 4,262,467
Faisant et al. [45] Apr. 21, 1981

[54] MODULAR ELEMENTS FORMING BY ASSEMBLY A SET OF VERTICAL OR HORIZONTAL SPACES IN A SINGLE PLANE OR OFFSET PLANES

[75] Inventors: Gilles Faisant; Gaston Reverdy, both of La Roche sur Yon, France

[73] Assignee: S I P A (Societe Industrielle des Plastiques de l'Atlantique), La Roche sur Yon, France

[21] Appl. No.: 2,949

[22] Filed: Jan. 12, 1979

[30] Foreign Application Priority Data

Jan. 18, 1978 [FR] France .............................. 78 02804

[51] Int. Cl.³ ............................................. E04C 1/10
[52] U.S. Cl. ...................................... 52/590; 47/66; 47/83; 52/608
[58] Field of Search ...................... 52/590, 608, 609, 9, 52/311; 215/10; 220/23.4; 206/504; 47/83, 66

[56] References Cited

U.S. PATENT DOCUMENTS

| 928,320 | 7/1909 | Moore | 52/590 |
| 2,892,340 | 6/1959 | Fort | 52/608 |
| 3,686,791 | 8/1972 | Mills | 47/83 |
| 3,862,683 | 1/1975 | Koelichen | 220/23.4 |
| 4,003,491 | 1/1977 | Wells | 215/10 |
| 4,133,152 | 1/1979 | Penrose | 52/311 |

FOREIGN PATENT DOCUMENTS

| 2000679 | 7/1971 | Fed. Rep. of Germany | 52/608 |
| 2415781 | 10/1975 | Fed. Rep. of Germany | 52/608 |
| 2502975 | 7/1976 | Fed. Rep. of Germany | 52/608 |
| 1467702 | 12/1966 | France | 52/590 |
| 19243 | of 1902 | United Kingdom | 52/590 |

Primary Examiner—Price C. Faw, Jr.
Assistant Examiner—H. E. Raduazo
Attorney, Agent, or Firm—Frost & Jacobs

[57] ABSTRACT

The invention relates to modular elements assembled either by juxtaposition in a single plane or in offset planes, or by superposition with angular displacement. Each modular element is constructed as a hollow right prism driven in or not at one of its ends and whose perpendicular cross-section is star-shaped with several arms inscribed in a circle or in a regular polygon. The arms form tenons alternating with hollow portions forming mortises thus enabling assembly of the modular elements to one another. Each mortise includes at its base two notches enabling assembly by superposition with angular displacement of two modular elements, a graft formed in the lower position of each lateral end of the tenons avoiding any interference in the course of this assembly. The invention can be used for the construction of flower boxes, bins, clisters or any other cellular units.

10 Claims, 6 Drawing Figures

MODULAR ELEMENTS FORMING BY ASSEMBLY A SET OF VERTICAL OR HORIZONTAL SPACES IN A SINGLE PLANE OR OFFSET PLANES

FIELD OF THE INVENTION

The present invention relates to prismatic modular elements whose section is shaped to permit the construction of solid assemblies by fitting together elements which are all identical and without the need to provide auxiliary elements such as keying elements, these assemblies forming a network of lines forming an angle of 60° with each other.

Such assemblies are useful every time that, for decorative purposes, it is desired to avoid the monotony of lines crossing at right angles, and for example, the elements may be designed for the creation of cellular assemblies which can contain plants or flowers, or any sort of articles. They are also useful when it is a question of filling to the optimum, a space of circular shape or again to obtain a more isotropic distribution in the plane by avoiding the formation of two preferential directions at right angles.

DESCRIPTION OF THE PRIOR ART

Prismatic modular elements of square or rectangular section are known of which each side bears one or several dovetailed tenons or mortises, which permits the construction of assemblies by the fitting together of adjoining elements (cf Fr. Pat. No. 1,125,609 and DE-OS No. 2,305,609). Such elements are complicated to produce, and their general shape only permits the obtaining of assemblies in the shape of a network formed by lines intersecting right angles.

It has also been proposed, in Application DE-OS No. 2,027,753, to provide modular elements in the form of a four-armed star each terminated by a widening which forms a tenon designed to be engaged between the arms of a neighboring element, the projections which form the tenon of one arm each cooperating with the projections borne by the neighbouring arm to constitute the edges of a dovetailed mortise. It is thus possible to obtain assemblies of very special appearance, in which the elements have alternately two orientations offset by 45°, and where large gaps subsist between the elements.

From another aspect, it has long been known to form assemblies of hexagonal elements so as to obtain a network of lines forming an angle of 60° with each other, but these assemblies are formed by juxtaposed elements without nesting together, so that, in order to form solid assemblies, it would be necessary to provide keying elements or more complicated shapes.

Thus, the problem consists of producing solid assemblies by the justaposition and nesting together of identical modular elements, and to obtain at the same time assemblies delineating a network of lines forming angles of 60° with each other.

It is an object of the present invention to provide a solution to this problem.

GENERAL DESCRIPTION OF THE INVENTION

According to the invention there is provided a prismatic modular element whose section has the shape of a regular star whose ends are widened in a direction perpendicular to the radius to form a projection on each side of the axis of the arm, each projection forming a tenon with the other projection constituting the widened end of the arm, and also forming the edge of a dovetailed mortise whose other edge is the corresponding projection borne by the neighbouring arm which has the features that the star is three-armed and each projection can cooperate at the same time with two similar projections borne by two neighbouring elements, by playing with the one the role of a portion of a tenon and with the other the role of a portion of a mortise.

Preferably the shape of the element corresponds to the following relationships:

$$A = C + e$$

$$B < A$$

$$B = D + E + e' + e'',$$

where
A is the maximum half-width of the tenon
B is the minimum half-width of the mortise
C is the maximum half-width of the mortise
D is the minimum half-width of the arm
E is the width of the projection, measured in a direction forming 30° with the axis of the arm bearing the projection.

$e$, $e'$, $e''$ are operating clearances, and advantageously the outer surface of one tenon and the inner surface of one mortise have corresponding shapes and do not leave between them, after assembly, any gap other than those corresponding to the operating clearances.

In this manner there are obtained assemblies in which the elements are adjoining over practically their whole surface, and without leaving a large gap between them.

According to an advantageous embodiment, the elements according to the invention are of plastics material or the like and constitute containers with relatively thin walls, these containers being either bottomless or with a bottom whose shape can be of any type but which is placed at a sufficient distance from the two ends to enable the walls to project over a certain length on each side and to permit the assembly of elements arranged in two successive layers. In this case, and to permit assembly with relative interlocking of the elements of the two layers, subject to angular displacement, an element is provided of which the edge has notches enabling relative immobilization of coaxial superposed elements with an angular displacement of 60°, and in which the vertical edges bounding the lateral ends of the arms are truncated at one of their ends over a height at least equal to that of the notch and over a sufficient extent to avoid any interference of said arm ends of two elements on their coaxial superposition with angular displacement.

BRIEF DESCRIPTION OF THE DRAWINGS

The accompanying drawings illustrate a preferred embodiment of a modular element with three arms according to the present invention, as well as different modes of assembly, given purely by way of illustrative and non-limiting example. In the drawings.

DESCRIPTION OF PREFERRED EMBODIMENTS

As shown in these drawings, the modular element 1 is constructed preferentially of plastics material as a hollow right prism with or without a bottom, and whose cross section is in the form of a three-armed star 2 inscribed, in the example selected, in a circle, the arms alternating with the hollow portions 3. Each of the latter is in the form of an isoceles trapezium with an incurved base of radius equal, except for the adjusting tolerances, to the radius of the circle in which the modular element 1 is inscribed, the inclined portions of the trapezium being connected with the vertical edges bounding the ends of the arms so as to form a mortise of dovetail shape. The sides of this mortise must correspond to quite accurate geometric rules.

Figure 2:
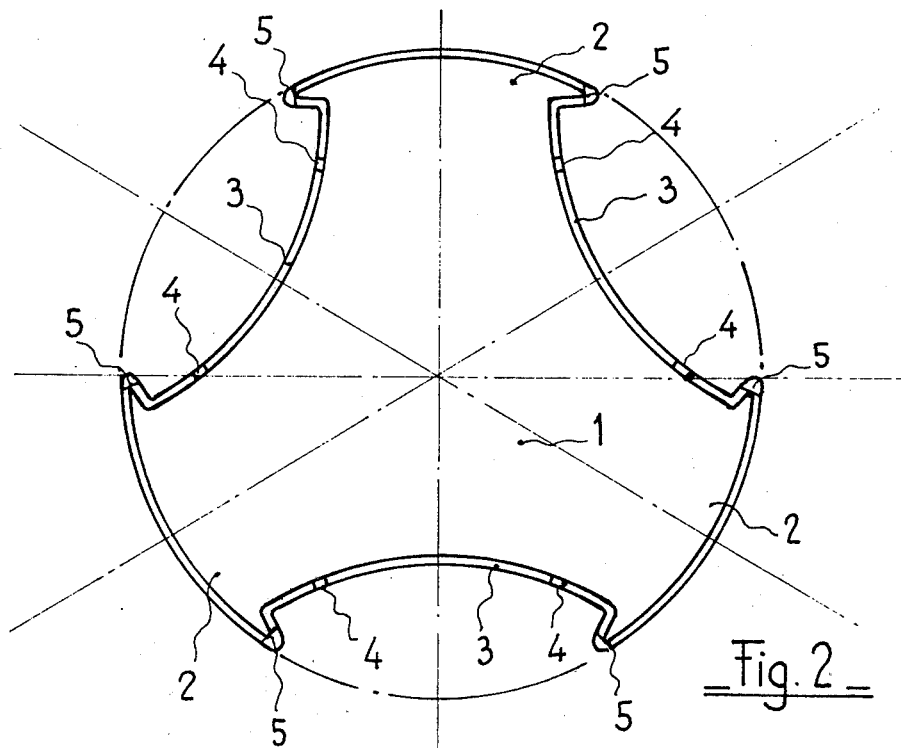
FIG. 2 shows a view from below of this element.
Figure 1:
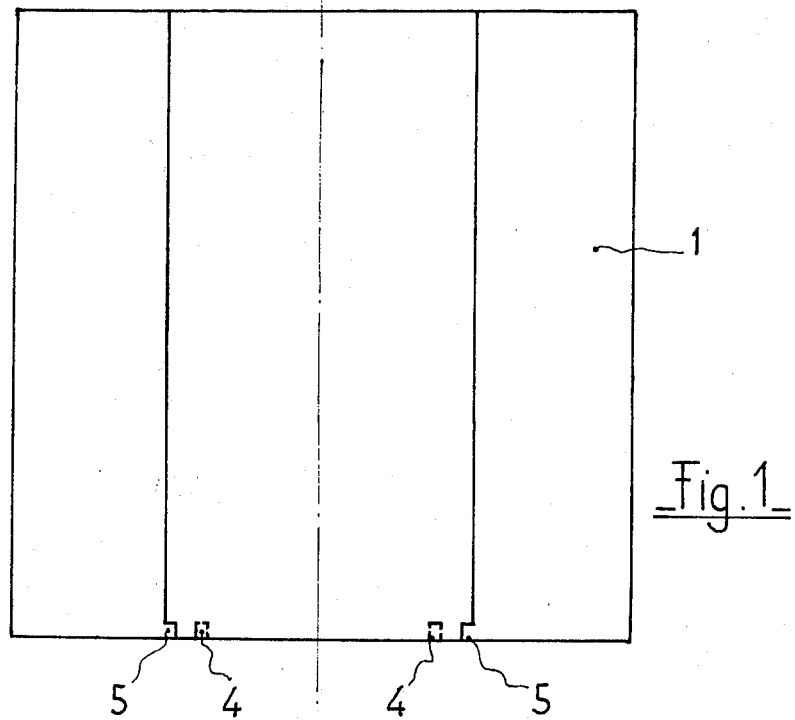
FIG. 1 shows a view in elevation of an embodiment of an element according to the invention.
Figure 3:
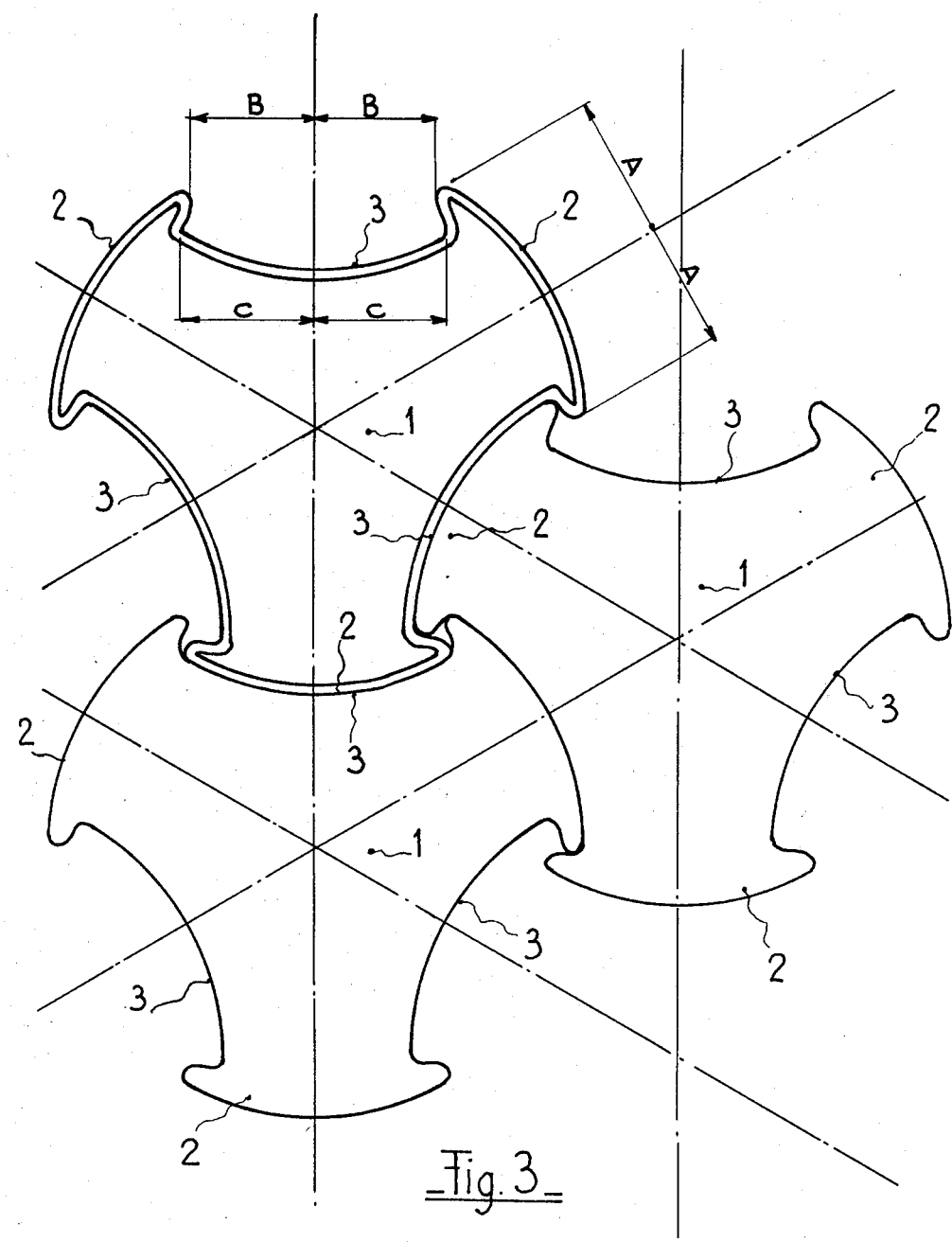
FIG. 3 shows the view from above of the assembly of three contiguous elements.
Figure 4:
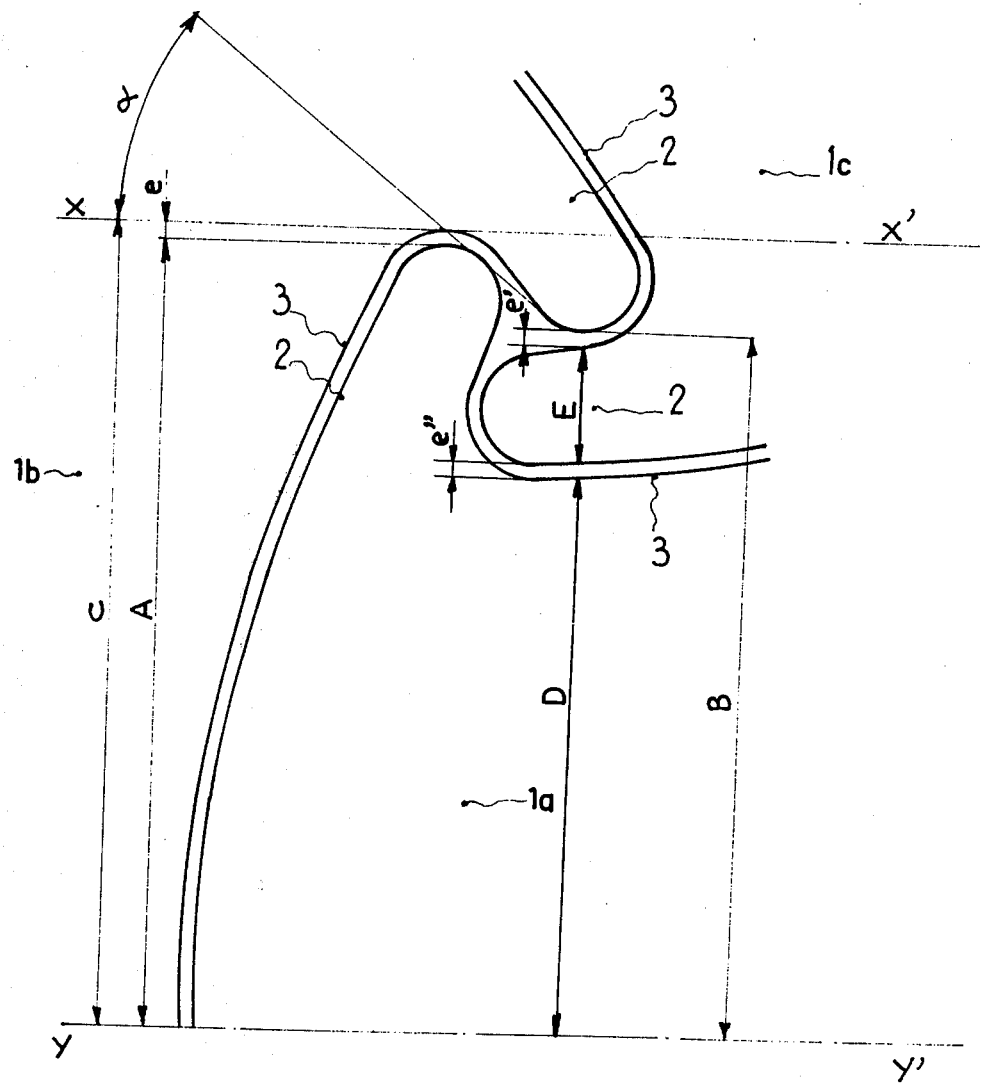
FIG. 4 shows a detail on a large scale of a part of the assembly of three contiguous elements.

Referring more particularly to FIG. 4, the latter represents the assembly of three elements 1a, 1b and 1c, all three shown in part; the elements 1a forms a tenon for the element 1b and a mortise for the element 1c. The axis YY' is the common axis of symmetry of the elements 1a and 1b, whilst the arm of element 1c which cooperates with the two other elements has an axis of symmetry which forms an angle of 60° with YY'.

In order to have interlocking, it is necessary that the common tangent to the projections of 1a and 1b should make with the axis XX', parallel to YY', an angle $\alpha$ such that it encounters the axis YY' on the side of the element 1a forming a tenon, that is to say to the right in the Figure.

For this, it is necessary that:

$$C = A + e$$

and that $$B < A,$$

A being the maximum half-width of the arm of the element 1a forming a tenon, B and C being the minimum and maximum half-widths of the mortise formed by the element 1b, and e being the operating clearance necessary for positioning.

In order that the projection of the element 1c may be housable in the mortise formed by the element 1a, wherein a projection of the element 1b also penetrates, it is necessary that:

$$B = D + E + e' + e'',$$

D being the minimum half-width of the arm of the element 1a, E being the width of the projection of the element 1c, taken perpendicularly to the axis YY', that is to say in a direction forming an angle of 30° with the axis of the arm of the element 1c, and e' and e'' being the operational clearances.

In the figures, elements are shown for which the outer surface of the tenon is a cylinder concentric with the element and the inner surface of the mortise has a corresponding shape so as to avoid any unnecessary play. It is clear that different shapes, flat, polygonal, variable curvature, etc., can be envisaged without departing from the scope of the invention. The shape shown has however advantages of great simplicity of execution and great robustness for each element.

Figure 5:
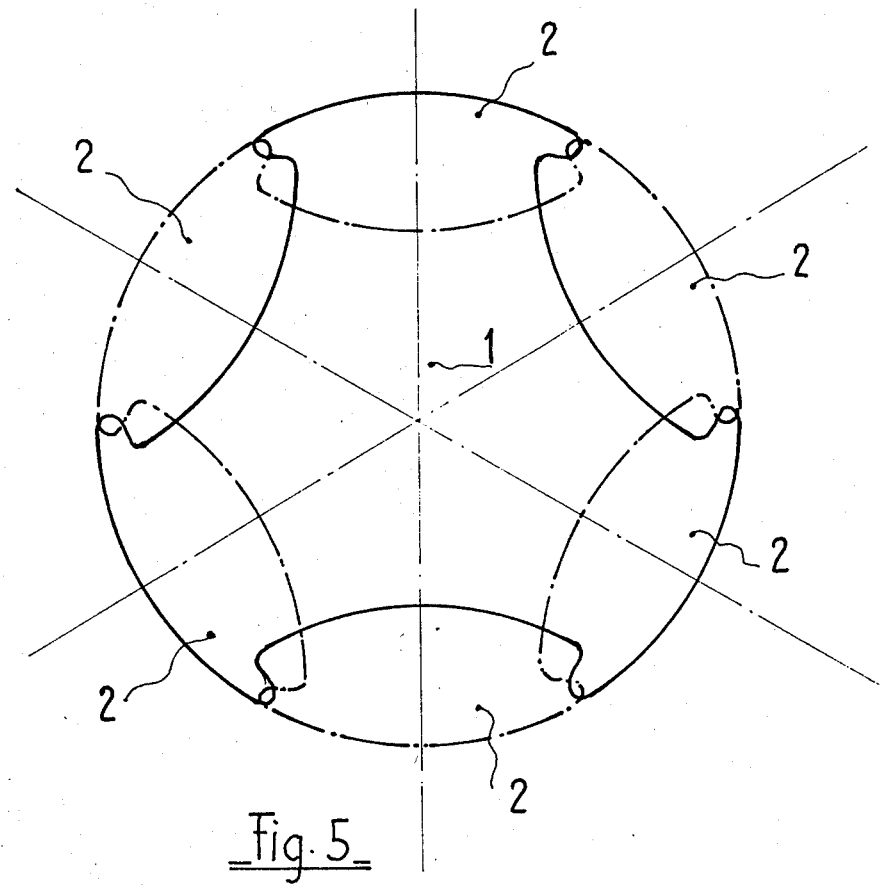
FIG. 5 shows a view from above of the assembly of two elements by angular superposition.

The posterior portion of the modular element includes on the base of each trapezoidal mortise two Notches 4 of width equal, except for assembling clearances, to the thickness of the lateral sides of the element. These notches are arranged symmetrically with respect to the axis of the mortise, their machining corresponds to that of a circular cut of rectangular or square cross-section of inner and outer radii corresponding to the inner and outer radii of the generator circle of the base of the trapezoidal mortises 3 and with the center corresponding to that of the modular element assembled in each of these mortises. These notches enable the assembly of elements by superposition with angular offsetting, by 60° in the example selected, as shown in FIG. 5. To avoid the interference of the vertical edges bounding the ends of the arms, the latter include at their lower portion and over a height equal to the depth of the notches 4, a graft 5 truncating the end rounded edge.

Figure 6:
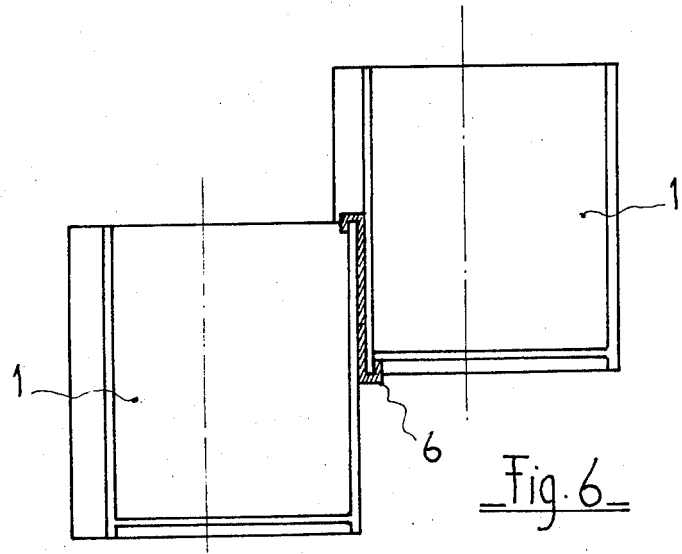
FIG. 6 shows a view in sectional elevation of two elements along two offset levels.

The modular elements may or may not have a bottom. In the first case, they can be used as a flower pot and enable in this way the construction of floral compositions with numerous and varied effects. In particular, the arrangement previously described, including an assembly by superposition with angular displacement of two or several layers of modular elements, enables, for example, the construction of a floral composition from climbing or pendant plants associated with plants or flowers with short stems, said climbing or pendant plants being spreadable over non-covered areas of the ends of the arms, the other plants being in tanks situated at the upper level and, generally, in uncovered tanks. In this version of utilization, each modular element receives a grid held by means of ribs at a certain distance from the bottom so as to constitute a reserve of water into which dip three drain sumps provided on the grid. One of the sides of the element can then include a checking window for the water level. FIG. 6 shows the mode of assembly and of positioning two elements on two offset levels by means of S-shaped hooks 6 whose upper ends are hooked on the thickness of the upper edge of the mortise of one of the elements and whose lower ends receive the thickness of the lower edge of the end of the arm of the other element.

In other cases of the utilization in vertical planes such as shelving, storage furniture, bottle racks, the elements cannot include a bottom. Another application of the invention consists of the construction of cloisters.

I claim:

1. A prismatic modular element assemblable with two similar elements, said element having a cross section with the shape of a regular star having arms, said arms being symmetrical relative to an axis passing through the center of said star, and the outermost ends of said arms being widened in a direction perpendicular to the axis of the arms to form a single projection on each side of the arms, said projections forming a dovetail tenon, the spaces between the projections on adjoining arms forming dovetail mortises of a width substantially equal to the width of said dovetail tenons, said star having three arms and each projection being cooperable with two similar projections borne by two similar elements, constituting with one of said similar projections a part of a tenon, and with the other of said similar projections a part of a mortise.

2. Element according to claim 1, conforming to the following relationships:

$$C = A + e$$

$$B < A$$

$$B = D + E + l' + e'',$$

where
- A is the maximum half-width of the tenon,
- B is the minimum half-width of the mortise,
- C is the maximum half-width of the mortise,
- D is the minimum half-width of the arm,
- E is the width of the projection, measured in a direction form 30° with the axis of the arm bearing the projection,
- e, e', e'' are operating clearances.

3. Element according to claim 1, wherein the outer surface of a tenon and the inner surface of a mortise have corresponding shapes and do not leave between them, after assembly, any gap other than those corresponding to operating clearances.

4. Element according to claim 2, wherein the outer surface of a tenon and the inner surface of a mortise have corresponding shapes and do not leave between them, after assembly, any gap other than those corresponding to operating clearances.

5. Element according to claim 1, and constructed in the form of a relatively thin walled tube, and whose edge has notches enabling the relative immobilization of coaxial superposed elements with an angular displacement of 60°, the vertical edges bordering the lateral ends of the arms being truncated at one of their ends over a height at least equal to that of the notch and over a sufficient extent to avoid any interference of said arm ends of two elements during their coaxial superposition with angular displacement.

6. Element according to claim 2, and constructed in the form of a relatively thin walled tube, and whose edge has notches enabling the relative immobilization of coaxial superposed elements with an angular displacement of 60°, the vertical edges bordering the lateral ends of the arms being truncated at one of their ends over a height at least equal to that of the notch and over a sufficient extent to avoid any interference of said arm ends of two elements during their coaxial superposition with angular displacement.

7. Element according to claim 3, and constructed in the form of a relatively thin walled tube, and whose edge has notches enabling the relative immobilization of coaxial superposed elements with an angular displacement of 60°, the vertical edges bordering the lateral ends of the arms being truncated at one of their ends over a height at least equal to that of the notch and over a sufficient extent to avoid any interference of said arm ends of two elements during their coaxial superposition with angular displacement.

8. Element according to claim 4, and constructed in the form of a relatively thin walled tube, and whose edge has notches enabling the relative immobilization of coaxial superposed elements with an angular displacement of 60°, the vertical edges bordering the lateral ends of the arms being truncated at one of their ends over a height at least equal to that of the notch and over a sufficient extent to avoid any interference of said arm ends of two elements furing their coaxial superposition with angular displacement.

9. An assembly of elements according to claim 1, comprising intercalating positioning hooks between adjacent elements to assemble them in offset horizontal planes.

10. An assembly of elements according to claim 8, comprising intercalating positioning hooks between adjacent elements to assemble them in offset horizontal planes.

* * * * *